US00RE47717E

(19) United States
(12) Reissued Patent
Tung

(10) Patent Number: US RE47,717 E
(45) Date of Reissued Patent: Nov. 5, 2019

(54) SERIAL OUTPUT REDIRECTION USING HTTP

(71) Applicant: QUANTA COMPUTER INC., Taoyuan (TW)

(72) Inventor: Yen-Ping Tung, New Taipei (TW)

(73) Assignee: QUANTA COMPUTER INC., Taoyuan (TW)

(21) Appl. No.: 15/959,955

(22) Filed: Apr. 23, 2018

Related U.S. Patent Documents

Reissue of:
(64) Patent No.: 9,282,072
Issued: Mar. 8, 2016
Appl. No.: 14/541,998
Filed: Nov. 14, 2014

(51) Int. Cl.
*H04L 12/58* (2006.01)
*G06F 17/22* (2006.01)
(Continued)

(52) U.S. Cl.
CPC ..... *H04L 51/24* (2013.01); *G06F 13/105* (2013.01); *G06F 13/385* (2013.01);
(Continued)

(58) Field of Classification Search
CPC ..... H04L 1/0076; H04L 5/0032; H04L 9/08; H04L 9/0816; H04L 9/0819; H04L 9/083; H04L 9/3268; H04L 12/189; H04L 12/2838; H04L 12/2874; H04L 12/2878; H04L 12/2896; H04L 12/40117; H04L 13/10; H04L 13/12; H04L 13/14; H04L 25/02; H04L 25/42; H04L 25/44; H04L 25/45; H04L 27/2611; H04L 27/2643; H04L 29/06428; H04L 29/06455
(Continued)

(56) References Cited

U.S. PATENT DOCUMENTS 6,665,731 B1 12/2003 Kumar
7,234,964 B1 6/2007 Karstens
(Continued)

FOREIGN PATENT DOCUMENTS

CN 101114966 1/2008
CN 103049342 4/2013
WO 2014143034 A1 9/2014

OTHER PUBLICATIONS

European Search Report No. EP 15 16 7618, dated Mar. 2, 2016, 9 pages.

(Continued)

*Primary Examiner* — Minh Dieu Nguyen
(74) *Attorney, Agent, or Firm* — Nixon Peabody LLP; Zhou Lu

(57) ABSTRACT

A service controller on a computing device can be configured to redirect serial output over a network using HTTP. For example, the service controller can be configured with a web server that can receive the serial output and stream the serial output to a web browser over an HTTP connection. In some implementations, the HTTP connection can be a WebSocket connection, as defined by the HTML5 specification. In some implementations, a proxy server can be configured with a web server that can receive serial over LAN (SOL) output from multiple servers and stream the SOL to a web browser on a client device.

19 Claims, 6 Drawing Sheets

(51) Int. Cl.

| | |
|---|---|
| ***G06F 13/10*** | (2006.01) |
| ***H04L 12/26*** | (2006.01) |
| ***H04L 29/08*** | (2006.01) |
| ***G06F 13/38*** | (2006.01) |
| ***H04L 29/06*** | (2006.01) |
| *G06F 9/54* | (2006.01) |
| *G07F 17/32* | (2006.01) |

(52) U.S. Cl.
CPC ..... *G06F 17/2247* (2013.01); *H04L 43/0817* (2013.01); *H04L 67/2814* (2013.01); *H04L 69/08* (2013.01); *G06F 9/54* (2013.01); *G07F 17/3209* (2013.01); *H04L 67/025* (2013.01); *H04L 67/2838* (2013.01)

(58) Field of Classification Search
USPC ..... 709/224, 201, 202; 715/760
See application file for complete search history.

(56) References Cited

U.S. PATENT DOCUMENTS

| | | | | |
|---|---|---|---|---|
| 7,447,889 | B2 | 11/2008 | Cartes et al. | |
| 7,478,152 | B2 | 1/2009 | Holt et al. | |
| 7,543,277 | B1 | 6/2009 | Righi et al. | |
| 7,552,213 | B2 | 6/2009 | De Oliveira et al. | |
| 7,594,144 | B2 | 9/2009 | Brandyberry et al. | |
| 7,660,910 | B2 | 2/2010 | Miller et al. | |
| 7,950,999 | B2 * | 5/2011 | Morrow | G07F 17/3209 463/16 |
| 8,346,912 | B2 * | 1/2013 | Bhadri | G06F 13/105 709/201 |
| 8,370,748 | B1 | 2/2013 | Maity | |
| 8,484,325 | B1 | 7/2013 | Maity | |
| 8,650,273 | B2 | 2/2014 | Lambert et al. | |
| 8,805,983 | B2 | 8/2014 | Dube et al. | |
| 2005/0129035 | A1 | 6/2005 | Saito | |
| 2009/0055157 | A1 | 2/2009 | Soffer | |
| 2010/0281107 | A1 * | 11/2010 | Fallows | G06F 9/54 709/203 |
| 2013/0185402 | A1 | 7/2013 | Ayanam et al. | |
| 2013/0238785 | A1 | 9/2013 | Hawk et al. | |
| 2014/0108618 | A1 * | 4/2014 | Lee | H04L 12/2838 709/219 |
| 2014/0222890 | A1 | 8/2014 | Zhu et al. | |
| 2014/0281894 | A1 * | 9/2014 | Maity | G06F 9/452 715/234 |

OTHER PUBLICATIONS

Dell, "Configuring Intelligent Platform Management Interface (IPMI)", Retrieved on Dec. 4, 2014, from: http://web.mit.edu/cron/documentation/dell-server-admin/en/DRAC_5/racugc1j.htm. (8 pages).

Hofstadtler, "Lessons learned with Supermicro's remote management/IPMI view", Retrieved from: http://christian.hofstaedtler.name/blog/2010/05/lessons-learned-with-supermicros-remote-managementipmi-view.html (2013). (2 pages).

Ovh, "Serial-Over-Lan", Retrieved from: https://www.ovh.co.uk/dedicated_servers/serial_over_lan.xml (Oct. 18, 2011). (1 page).

* cited by examiner

SERIAL OUTPUT REDIRECTION USING HTTP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present application is a reissue of U.S. Pat. No. 9,282,072, issued on Mar. 8, 2016, from application Ser. No. 14/541,998, filed on Nov. 14, 2014.*

TECHNICAL FIELD

The disclosure generally relates to redirecting serial output of a computing device over a network.

BACKGROUND

Serial over LAN (local area network) is a mechanism that enables the input and output of the serial port of a computing device to be redirected over an Internet protocol (IP) network. In order to receive the redirected serial output (e.g., console messages, system log messages, etc.), a client device must be configured with an intelligent platform management interface (IPMI) compliant tool to connect to an IPMI compliant controller that is configured to perform the serial output redirection. Not only must the client device be configured with an IPMI tool to receive the console messages, the user (e.g., server administrator) of the client device must know how to configure and use the IPMI tool.

SUMMARY

In some implementations, a service controller on a computing device can be configured to redirect serial output over a network using HTTP. For example, the service controller can be configured with a web server that can receive the serial output of the computing device and stream the serial output to a web browser over an HTTP connection. In some implementations, the HTTP connection can be a WebSocket connection, as defined by the HTML5 specification. In some implementations, a proxy server can be configured with a web server that can receive serial over LAN (SOL) output from multiple servers and stream the SOL to a web browser on a client device.

Particular implementations provide at least the following advantages. First, a server administrator no longer needs a special IPMI tool to access console messages generated by a computing device. Second, the server administrator can use any web browser, compliant with the HTTP connection, on any device to access the console messages and debug problems with a server.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
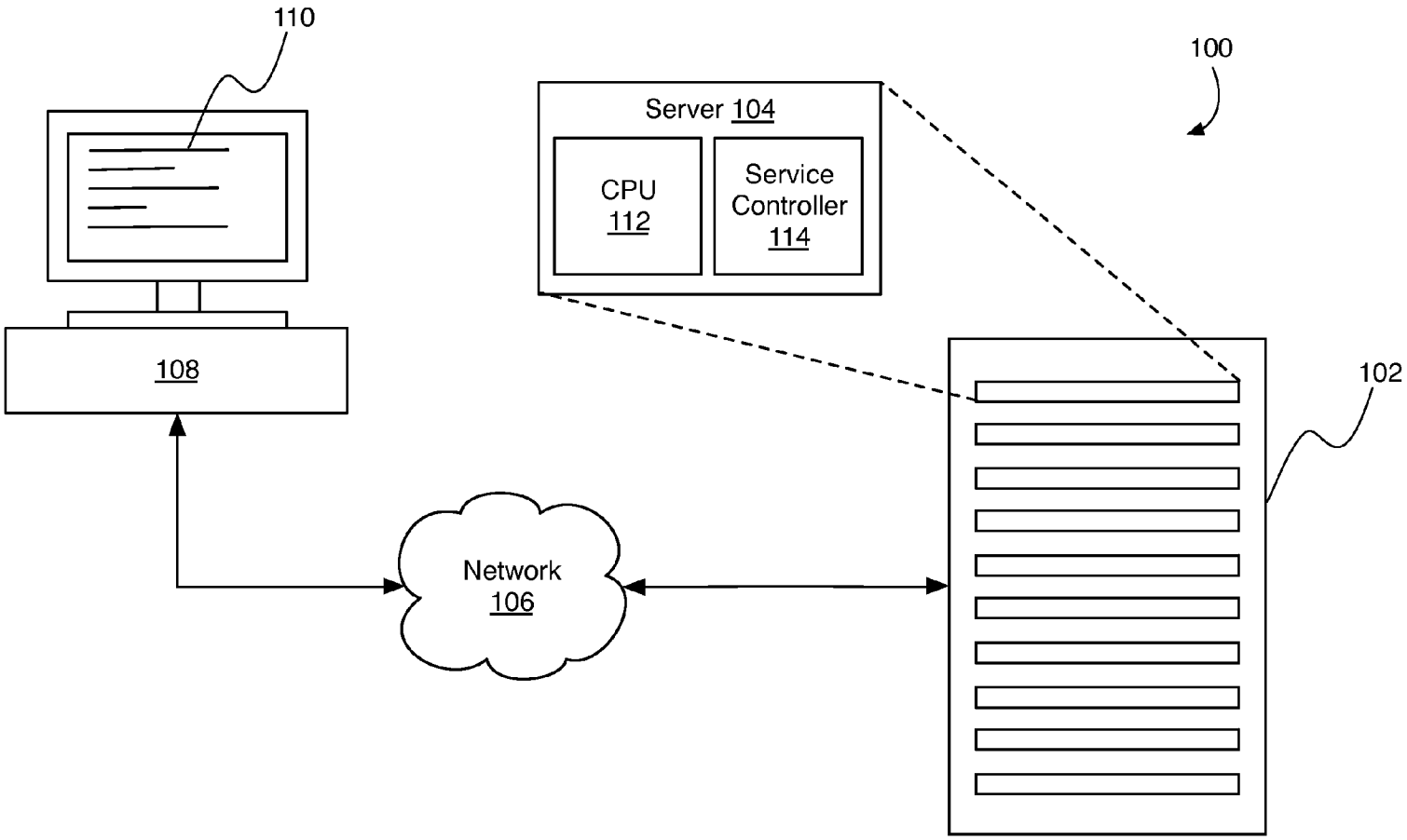
FIG. 1 (Prior Art)
FIG. 1 illustrates an example system for redirecting serial output over a network.

FIG. 1 illustrates an example system 100 for redirecting serial output over a network. In some implementations, system 100 can include server rack 102 that includes multiple servers 104. Each server 104 can include central processing unit (CPU) 104 and a service controller 114. CPU 104 can be the main processor for server 104. In some embodiments, at least one of servers 104 can include multiple CPUs.

In some implementations, service controller 114 can be, for example, a baseboard management controller (BMC). A baseboard management controller is a specialized service processor that monitors the physical state of server 104 using sensors and communicating with the system administrator through an independent connection (e.g., out-of-band). The BMC is part of the intelligent platform management interface (IPMI) and is usually contained in the motherboard of server 104. The BMC can operate independently of CPU 112. Further, the BMC can operate even when CPU 112 is powered down and server 104 is powered off.

In some implementations, service controller 114 can be configured to redirect serial output over a network connection. For example, service controller 114 can be configured to receive serial output (e.g., console messages) from CPU 112, or other components of server 104, and redirect the serial output to network 106 (e.g., a local area network, wide area network, the Internet, etc.). For example, service controller 114 can implement serial over LAN serial output redirection. However, the present technology is not limited in this regard and any type of network can be utilized and corresponding network connection types and protocols can be utilized to support the redirecting of the serial output.

In some implementations, client device 108 can access the serial output from server 104 using an IPMI compliant tool. For example, the IPMI compliant tool can be used to configure client device 108 to interface with the service controller 114 over network 106 to receive the serial messages redirected to network 106 by service controller 114. For example, client device 108 can be a desktop computer, laptop computer, tablet device or handheld device. In some implementations, client device 108 can present the serial output received from server 104 on a display coupled to client device 108. For example, the serial output can include console messages generated by server 104. These console messages can be displayed as lines of text 110 on the display of client device 108. However, the present technology is not limited in this regard and the console messages can be presented in any other form or format by client device 108. For example, the console messages can be presented using graphical elements or a combination of lines of text and graphical elements representing the console messages.

Figure 2:
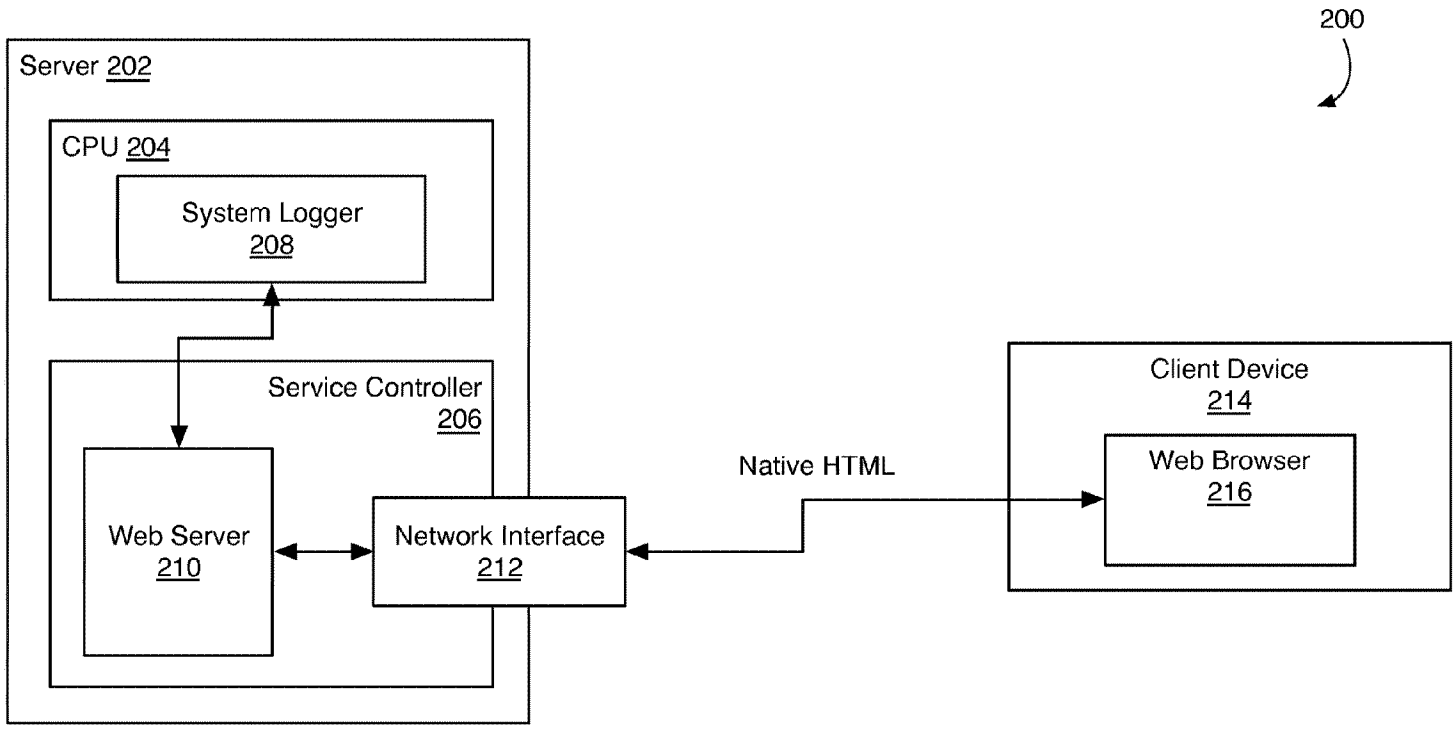
FIG. 2 illustrates an example system for redirecting serial output using HTTP.

FIG. 2 illustrates an example system 200 for redirecting serial output using HTTP. In some implementations, server 202 can be configured to redirect serial output to a browser on a client device using HTTP. For example, server 202 in system 200 can correspond to server 104 in FIG. 1. Server 202 can include CPU 204 and service controller 206. CPU 204 can be the main processor of server 202, for example. CPU 204 can be configured with a system logger function 208. For example, the operating system, BIOS and other applications running on server 202 can be configured to send console output (e.g., logging, debugging) messages to system logger 208. System logger 208 can receive the console output messages and send the console messages to the serial port of server 202.

In some implementations, service controller 206 can be configured to redirect serial output messages (e.g., messages destined for the serial port) to network interface controller 212. For example, network interface controller 212 can be a network interface controller dedicated to service controller 206. However, in some implementations, the network interface controller 212 can be shared with other components in system 202. Network interface controller 212 can provide for out-of-band communication between service controller 206 and an IPMI compliant client application.

In some implementations, service controller 206 can be configured with web server 210. For example, web server 210 can be configured to receive serial output messages from system logger 208 and redirect the serial output messages over the network using HTTP. For example, web server 210 can be an HTML5 compliant web server that provides for upgrading a regular HTTP session to a session compliant with the WebSocket protocol specification. Thus, web server 210 can transmit serial output messages (e.g., console) messages using native HTML5 mechanisms and without using add-ons (e.g., embedded java, Flash, or other client-server mechanisms). For example, web server 210 can be configured transmit WebSocket messages using a full-duplex communication channel over a single TCP connection. The WebSocket messages allow the web server and web browser to maintain an open communication channel for transmission of data packets. Thus, web server 210 can stream serial output messages generated by system logger 208 to the network in real-time or near real-time. However, in some implementations, the communications channel can be opened as needed to transmit data packets.

In some implementations, client device 214 can be configured with web browser 216. For example, web browser 216 can be an HTML5 compliant web browser that is capable of establishing a WebSocket connection with an HTML5 compliant web server. Client device 214 can be any device configured with an HTML5 compliant web browser. For example, client device 214 can be a laptop computer, tablet computer, handheld device or other similar computing device.

In some implementations, a user (e.g., server administrator) can use web browser 216 to view serial output (e.g., console messages) generated by server 202. For example, the system administrator can enter the IP address of web server 210 in web browser 216. Web browser 216 can use the IP address to connect to web server 210 over a network (e.g., the Internet) and through network interface controller 212. To establish a WebSocket connection, web browser 216 can perform a conventional HTTP handshake with web server 210 to establish a connection and then request an upgrade to a WebSocket protocol connection. Once the upgrade is complete, web server 210 can stream the serial output messages received from system logger 208 over a TCP connection to web browser 216. For example, web server 210 can translate the serial output (e.g., terminal or console output) from server 202 into a WebSocket message using a built in HTML5 parser. For example, the WebSocket connection can be established through a web page provided by web server 210 according to a conventional techniques. Once the serial output messages are received from server 202, web browser 216 can display the serial output messages on the web page that is configured to work with the WebSocket connection.

Figure 3:
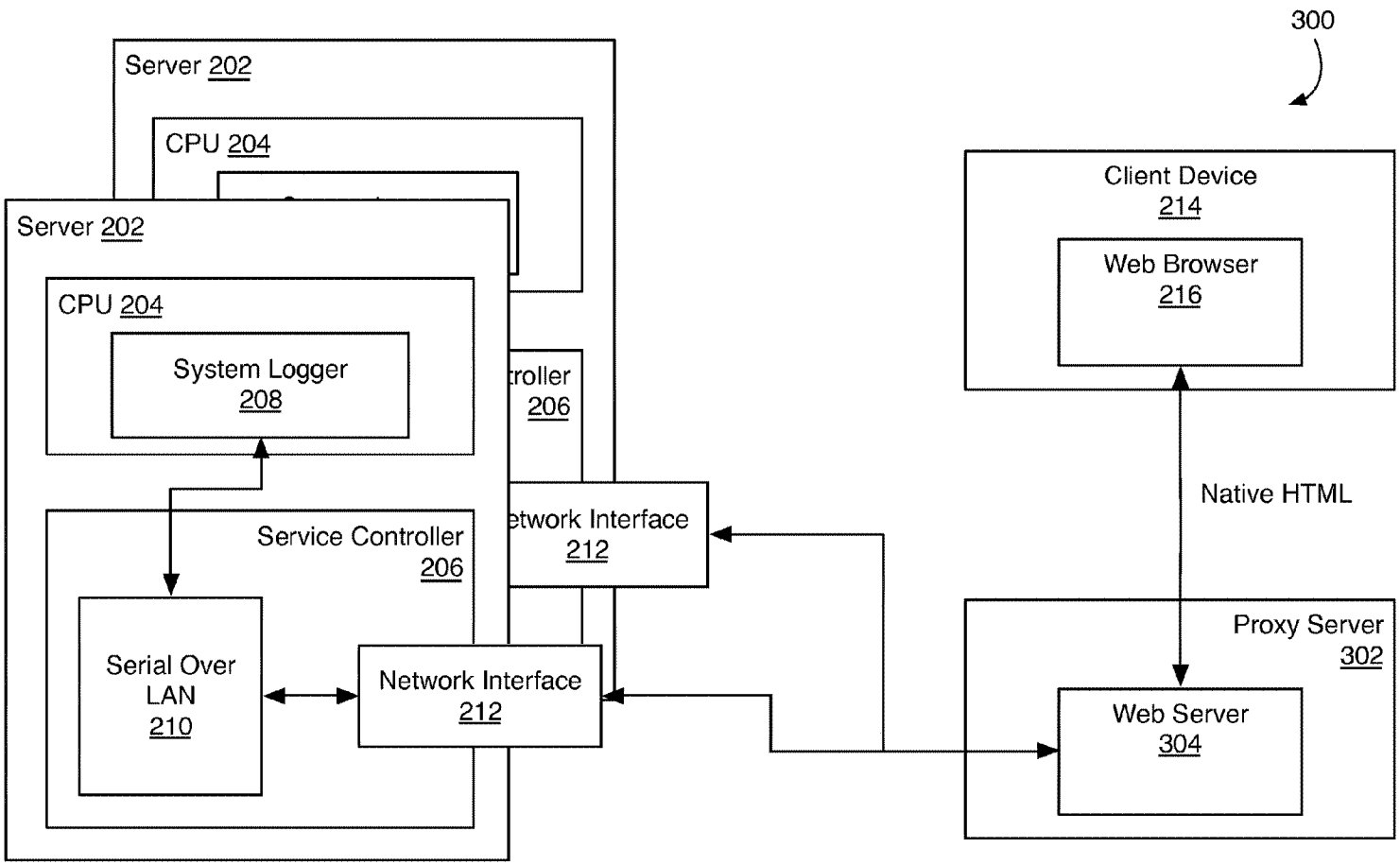
FIG. 3 is an example system for redirecting serial output using HTTP and a proxy server.

FIG. 3 is an example system 300 for redirecting serial output using HTTP and a proxy server. For example, rather than configuring service controller 206 with web server 210 as in FIG. 2, web server 304 can be configured on proxy server 302. Web server 304 can be configured to receive serial output from server 202, or multiple servers 202, and generate a web page including a WebSocket connection for streaming serial output from server 202 to web browser 216 on client device 214.

In some implementations, web server 304 on proxy server 302 can be configured to interact with the IPMI interface of service controller 206 to request serial output from server 202. For example, service controller 206 can be configured with serial over LAN function 210 to redirect system logger 208 output to network interface 212 so that system logger 208 output (e.g., serial output, console messages, etc.) can be received by web server 304. For example, web server 304 can be configured with the IP address and port of each service controller 206 on each monitored server 202 (only one shown). Web server 304 can use the IP address and port of each service controller 206 to establish a connection to each respective service controller 206 and receive serial output from each respective server 202. In some implementations, web server 304 can maintain simultaneous IPMI connections to multiple servers 202.

In some implementations, web server 304 can be configured to stream the serial output received from service controller 206 to web browser 216 on client device 214. For example, a user of client device 214 (e.g., a server administrator) can enter the IP address of web server 304 on proxy server 302 into web browser 216. Web browser 216 can then use the IP address of web server 304 to connect to web server 304 over a network (e.g., the Internet). Once web browser 216 connects to web server 304, web server 304 can send to web browser 216 a web page that identifies each server 202 to which web server 304 is currently connected. The user can select a server 202 to monitor by providing input to the web page displayed in web browser 216. Once the user makes a selection, web browser 216 can establish a WebSocket connection with web server 304 to stream the serial output from the selected server 202 to web browser 216.

In some implementations, web browser 216 can be configured to establish new connections to other servers through web server 304. For example, the web page delivered to web browser 216 from web server 304 can include functionality to specify the IP address of service controllers of other servers. Web browser 216 can send the specified IP address to web server 304. Web server 304 can use the specified IP address to establish a new connection to a new service controller and receive serial output from the specified service controller.

In some implementations, web browser 216 and web server 304 can establish multiple, simultaneous WebSocket connections. For example, the user of client device 214 may wish to monitor multiple servers 202 simultaneously. The web page delivered to web browser 216 can be configured to support presenting serial output (e.g., console messages, system log messages, system error messages, etc.) from multiple servers 202 simultaneously. Thus, the user can select each server 202 that the user wishes to monitor and WebSockets can be established for each selected server 202. Alternatively, the web page can be configured with a single WebSocket connection that transmits serial output messages received from multiple servers. The web page can be configured to organize and display the messages from multiple servers in an easy to read format, for example.

In some implementations, the client device 214 can use the TCP connection (e.g., WebSocket connection) established between client device 214 and the server (e.g., server 202 or proxy server 302) to send commands from client device 214 to service controller 206. For example, when client device 214 is directly connected to service controller 206 of server 202 (as in FIG. 2), a user of client device 214 can use an interface (e.g., an emulated console interface on a webpage) of web browser 216 to enter commands (e.g., text, IPMI commands, etc.) to control server 202. Client device 214 can send the commands directly to web server 210 of service controller 206. Web server 210 can provide the commands to service controller 206 for execution.

When client device 214 is connected to service controller 206 of server 202 through proxy server 302, a user of client device 214 can use an interface (e.g., an emulated console interface on a webpage) of web browser 216 to enter commands (e.g., text, IPMI commands, etc.) to control server 202. Client device 214 can send a command to web server 304 on proxy server 302. In response to receiving the command, web server 302 can invoke the corresponding service controller API (e.g., IMPI compliant function) and send the command to service controller 206. Upon receiving the command, service controller 206 can perform the corresponding function or operation.

Figure 4:
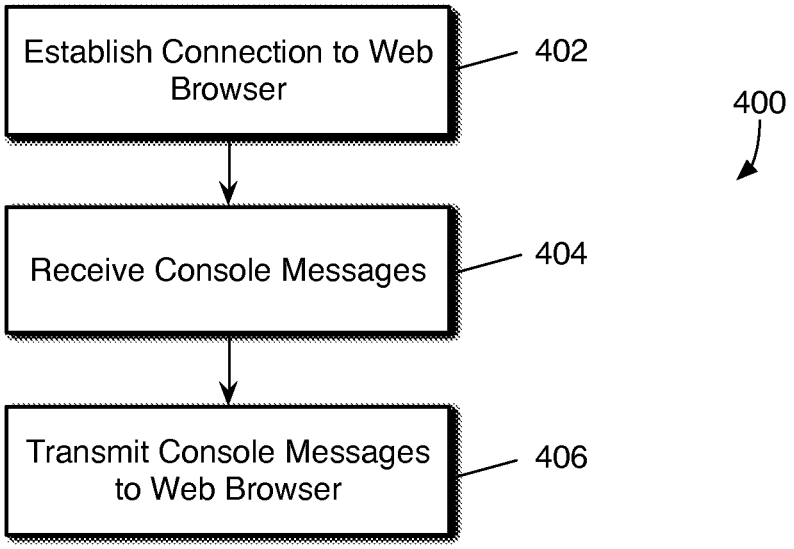
FIG. 4 is an example process for redirecting serial output using HTTP.

FIG. 4 is an example process 400 for redirecting serial output using HTTP. For example, process 400 can be performed by a service controller of a server, as described above. At step 402, the service controller of a computing device can establish a connection to a web browser. For example, the service controller can be configured with a web server. The web server can be accessible to a web browser running on a client device when the web browser is provided with the IP address of the web server or the IP address of the service controller. The web server can establish a WebSocket connection to the web browser on the client device in response to an HTTP request received from the web browser.

At step 404, the service controller can receive console messages from other components of the computing device. For example, the web server configured on the service controller can receive serial output messages (e.g., console messages) from the main CPU (e.g., software running on the main CPU) of the computing device.

At step 406, the service controller can transmit the console message to the web browser on the client device. For example, the web server on the service controller can stream the console messages to the web browser in real-time or near real-time. The console messages can be displayed on a web page provided by the web server and displayed on the web browser of the client device.

Figure 5:
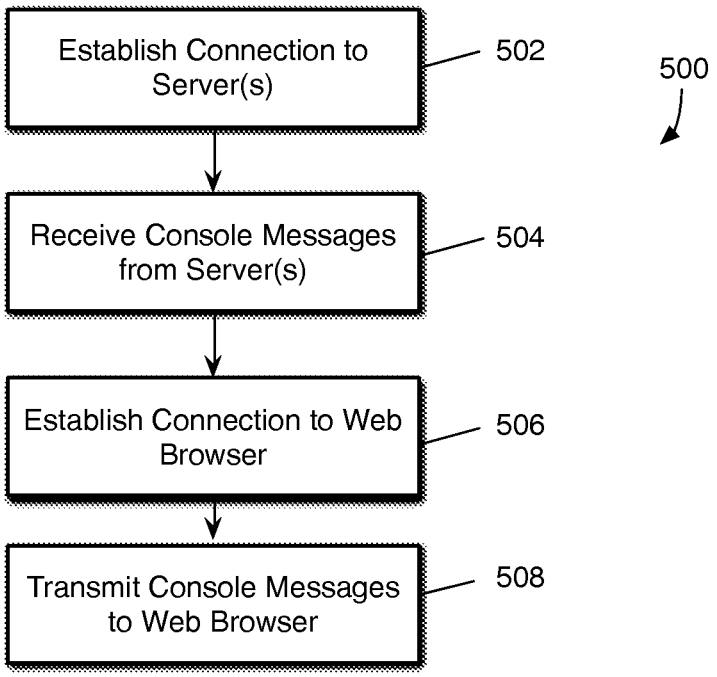
FIG. 5 is an example process for redirecting serial output using HTTP and a proxy server.

FIG. 5 is an example process 500 for redirecting serial output using HTTP and a proxy server. For example, process 500 can be performed by a web server running on a proxy server, as described above. At step 502, the proxy server can establish an IPMI connection to one or more managed servers. For example, a web server on the proxy server can be configured as an IPMI compliant client. The web server can be configured with the IP addresses of each service controller of each server to be monitored. The web server can connect to each server using the configured IP addresses through the IPMI interfaces of each service controller.

At step 504, the proxy server can receive the console messages from each server. For example, once the web server on the proxy server establishes a connection to each server to be monitored, the web server can receive serial output (e.g., console messages) from each of the monitored servers.

At step 506, the proxy server can establish a connection to the web browser of a client device. For example, the web server on the proxy server can receive a request from the web browser on the client device for a web page for viewing console messages from the monitored servers. The web server can return the requested web page to the web browser on the client device. The user of the client device can view the web page and select (e.g., from a list presented on the web page) which servers the user wishes to monitor.

At step 508, the proxy server can transmit the console messages received from the monitored servers to the web browser on the client device. For example, once the user selects the servers to monitor, the web browser can request that the web server on the proxy server establish a WebSocket connection with the web browser. Once the WebSocket connection is established, the web server can stream the console messages (e.g., serial output) for each selected server to the web browser on the client device. For example, the streamed console messages can be displayed on a web page presented by the web browser on the client device.

As described above, in some implementations, serial output redirection using HTTP can be realized using the HTML5 WebSocket protocol to stream the serial output (e.g., console messages) to a web browser. In other implementations, more traditional client-server (e.g., web server-browser, java applets, etc.) streaming technologies can be used to provide real-time or near real-time presentation of console messages on a web browser.

Example System Architecture

Figure 6:
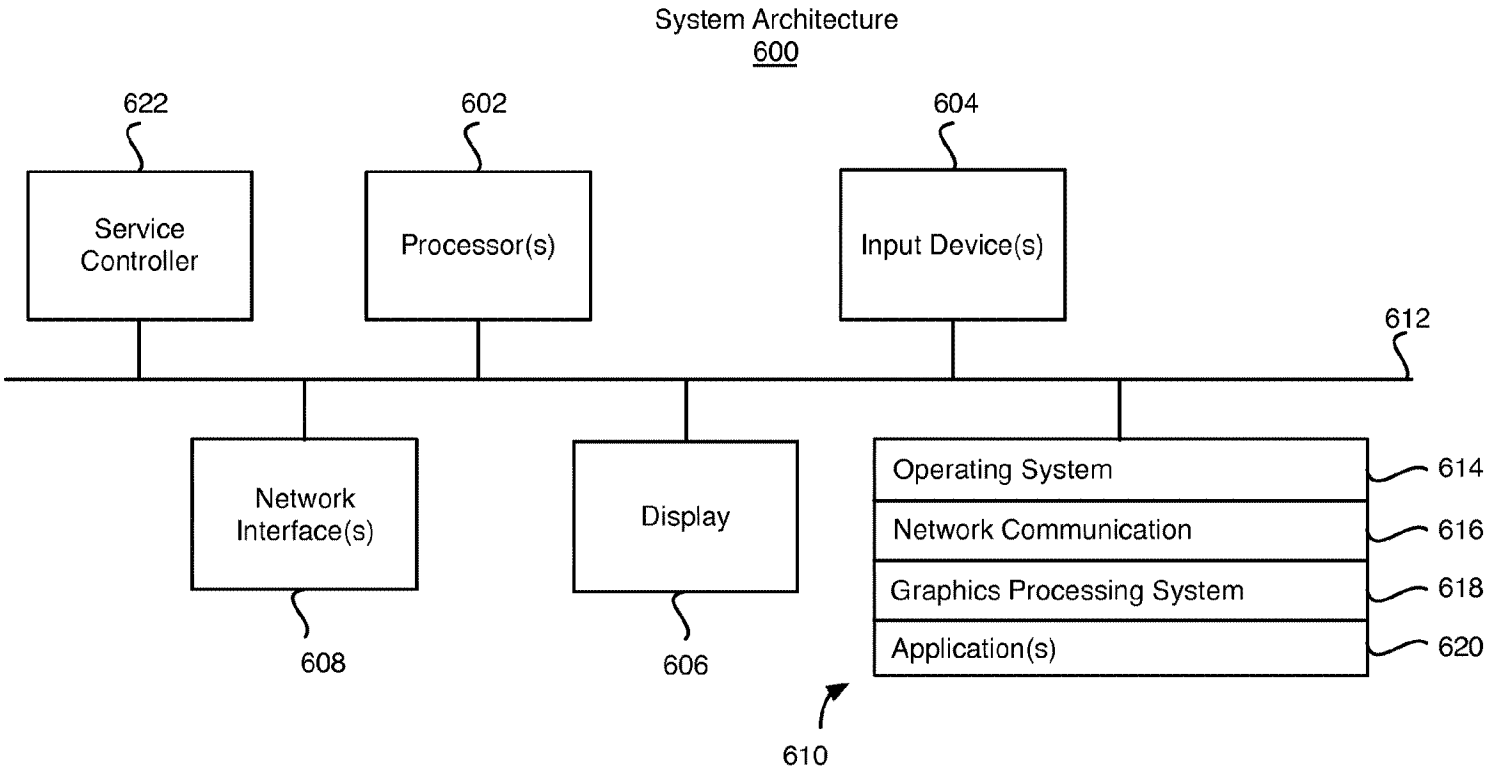
FIG. 6 is a block diagram of an example system architecture implementing the features and processes of FIGS. 1-5.

FIG. 6 is a block diagram of an example system architecture 600 implementing the features and processes of FIGS. 1-5. The architecture 600 can be implemented on any electronic device that runs software applications derived from compiled instructions, including without limitation personal computers, servers, smart phones, media players, electronic tablets, game consoles, email devices, etc. In some implementations, the architecture 600 can include one or more processors 602, one or more input devices 604, one or more display devices 606, one or more network interfaces 608 and one or more computer-readable mediums 610. Each of these components can be coupled by bus 612.

Display device 606 can be any known display technology, including but not limited to display devices using Liquid Crystal Display (LCD) or Light Emitting Diode (LED) technology. Processor(s) 602 can use any known processor technology, including but are not limited to graphics processors and multi-core processors. Input device 604 can be any known input device technology, including but not limited to a keyboard (including a virtual keyboard), mouse, track ball, and touch-sensitive pad or display. Bus 612 can be any known internal or external bus technology, including but not limited to ISA, EISA, PCI, PCI Express, NuBus, USB, Serial ATA or FireWire.

Computer-readable medium 610 can be any medium that participates in providing instructions to processor(s) 602 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 610 can include various instructions for implementing an operating system 614 (e.g., Mac OS®, Windows®, Linux). The operating system can be multi-user, multiprocessing, multitasking, multithreading, real-time and the like. The operating system performs basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 can establish and maintain network connections (e.g., software for implementing communication protocols, such as TCP/IP, HTTP, Ethernet, etc.).

A graphics processing system 618 can include instructions that provide graphics and image processing capabilities. For example, the graphics processing system 618 can implement the processes described with reference to FIGS. 1-5. Application(s) 620 can be an application that uses or implements the processes described in reference to FIGS. 1-5. For example, applications 620 can generate the console messages (e.g., serial output) that is redirected by the service controller using HTTP. The processes can also be implemented in operating system 614.

Service controller 622 can be a controller that operates independently of processor(s) 602 and/or operating system 614. In some implementations, service controller 622 can be powered and operational before processor(s) 602 are powered on and operating system 614 is loaded into processor(s) 602. For example, service controller 622 can provide for pre-OS management of the computing device through a dedicated network interface or other input device. For example, service controller 622 can be a baseboard management controller (BMC) that monitors device sensors (e.g., voltages, temperature, fans, etc.), logs events for failure analysis, provides LED guided diagnostics, performs power management, and/or provides remote management capabilities through an intelligent platform management interface (IPMI), keyboard, video, and mouse (KVM) redirection, serial over LAN (SOL), and/or other interfaces. Service controller 622 be implement the processes described with reference to FIGS. 1-5 above. For example, service controller 622 can be configured with a web server for redirecting the serial output over a network using HTTP.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:

receiving[,] at a service controller of a computing device, serial output messages from a processor of the computing device *destined for a serial port*;

*monitoring the service controller with a web server on a proxy server;* redirecting, by the service controller of the computing device, the serial output messages to [a] *the* proxy server;

translating, using a HTML parser associated with the proxy server, the serial output messages into corresponding HTML messages;

establishing, by the proxy server, a connection with a web browser on a client device using a native HTML mechanism; and streaming, by the proxy server, the corresponding HTML messages to the web browser using the native HTML connection.

[2. The method of claim 1, wherein the service controller is configured with a web server.]

3. The method of claim 1, wherein the connection is an HTML5 WebSocket connection.

4. The method of claim 1, wherein the service controller is a baseboard management controller.

5. The method of claim 1, wherein the connection is an out-of-band connection using a network interface controller dedicated to the service controller.

6. The method of claim 1, wherein the connection is established using hypertext transfer protocol.

7. A system comprising:

a baseboard management controller (BMC);

*a first server, the first server comprising* a processor;

*the first server further comprising a serial output port;* and a computer-readable medium including one or more sequences of instructions which, when executed by the baseboard management controller, causes:

receiving, [at] *via* the BMC, serial output messages from the processor *destined for the serial output port of the first server*; *and,* redirecting, by the BMC, the serial output messages to a proxy server*, which the proxy server is independent of the first server*;

translating, using a HTML parser associated with the proxy server, the serial output messages into corresponding HTML messages;

establishing, by the proxy server, a connection with a web browser on a client device using a native HTML mechanism; and streaming, by the proxy server, the corresponding HTML messages to the web browser using the native HTML connection.

8. The system of claim 7, wherein the BMC comprises a web server.

9. The system of claim 7, wherein the connection is an HTML5 WebSocket connection.

10. The system of claim 7, wherein the connection is an out-of-band connection using a network interface controller dedicated to the BMC.

11. The system of claim 7, wherein the connection is established using hypertext transfer protocol.

12. A method comprising:

*monitoring one or more managed servers by a web server running on a proxy server, which proxy server is independent from the one or more managed servers;* establishing, by [a] *the* proxy server, one or more first connections to *the* one or more managed servers *via a respective service controller on each of the one or more managed servers*, [the proxy server being independent from the one or more managed servers];

receiving, at the proxy server, serial output messages from the one or more managed servers *destined for a respective serial output port on each of the one or more managed servers and redirected the serial output messages to the proxy server by the respective service controller in response to a request from the web server*;

translating, using a HTML parser associated with the proxy server, the serial output messages into corresponding HTML messages;

establishing, by the proxy server, a second connection to a web browser on a client device using a native HTML mechanism; and streaming, by the proxy server, the corresponding HTML messages to the web browser using the native HTML connection.

13. The method of claim 12, wherein the proxy server includes a web server and the proxy server receives the serial output messages using an intelligent platform management interface connection to [a] *the* respective service controller on each of the one or more managed servers.

14. The method of claim 13, wherein the respective service controller is a baseboard management controller.

15. The method of claim 13, wherein each of the one or more first connections are out-of-band connections using a network interface controller dedicated to the respective service controller.

16. The method of claim 13, wherein each of the one or more first connections to the one or more managed servers uses an IPMI interface of the respective service controller.

17. The method of claim 12, wherein the second connection is an HTML5 WebSocket connection.

18. The method of claim 12, wherein the second connection is established using hypertext transfer protocol.

19. The method of claim 12, wherein the corresponding HTML messages are streamed to the web browser in near real-time.

20. The method of claim 12, wherein the serial output messages include console messages that are presented on a user interface of the web browser.

* * * * *